(12) United States Patent
Campbell et al.

(10) Patent No.: US 8,103,651 B2
(45) Date of Patent: Jan. 24, 2012

(54) AUTO-UPDATING READER PROGRAM FOR DOCUMENT FILES

(75) Inventors: Bruce Neil Campbell, Cupertino, CA (US); Jonathan Paul Patrizio, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2225 days.

(21) Appl. No.: 10/823,470

(22) Filed: Apr. 13, 2004

(65) Prior Publication Data

US 2005/0229093 A1 Oct. 13, 2005

(51) Int. Cl.
*G06F 17/30* (2006.01)

(52) U.S. Cl. ........................................ 707/709; 370/352

(58) Field of Classification Search .............. 707/4–10, 707/709–720; 370/351–356
See application file for complete search history.

(56) References Cited

U.S. PATENT DOCUMENTS

| 6,678,864 | B1 | 1/2004 | Tsai |
| 2002/0015042 | A1* | 2/2002 | Robotham et al. ............ 345/581 |
| 2002/0069282 | A1* | 6/2002 | Reisman ....................... 709/227 |
| 2003/0005134 | A1* | 1/2003 | Martin et al. ................. 709/229 |
| 2003/0050927 | A1* | 3/2003 | Hussam ............................ 707/5 |
| 2003/0061200 | A1 | 3/2003 | Hubert |
| 2003/0061201 | A1 | 3/2003 | Grefenstette |
| 2003/0101086 | A1* | 5/2003 | San Miguel ..................... 705/9 |
| 2003/0188262 | A1* | 10/2003 | Maxwell et al. .............. 715/507 |
| 2004/0246946 | A1* | 12/2004 | Nelson et al. ................. 370/352 |

* cited by examiner

*Primary Examiner* — Wilson Lee

(57) ABSTRACT

A document reader program determines the existence of an updated version of a document file at a network location specified by an original version of the document file. The document reader program then presents the user a choice of rendering the original version or the updated version in human-cognizable form. For example, a user can request help for a host application, which accesses an original version of a help file via the document reader. Instead of displaying information from the original help file, the reader access a network location specified in the original help file, downloads an updated help file and then displays its information to the user. The updated help file can correspond to the local version of the host application or, in another embodiment, the most-recent help file for the most-recent version of the host application.

10 Claims, 3 Drawing Sheets

AUTO-UPDATING READER PROGRAM FOR DOCUMENT FILES

BACKGROUND OF THE INVENTION

The present invention relates to computers and, more specifically, to electronic documents. A major objective of the invention is to provide for more convenient notice of and access to updated versions of electronic documents.

Access to information has been revolutionized by the development of computers, networks, and, especially, the Internet. Typically, a user can find a multitude of electronic documents on any given subject merely by typing appropriate key words into a Internet search engine. In many cases, the documents can be downloaded to the user's computer for more convenient access in the future. Two of the most common formats for these documents are html ("HyperText Markup Language") and pdf (portable document format). Each of these formats requires an appropriate reader program, e.g., a web browser for html, and Adobe Acrobat (available from Adobe Systems, Inc.) for pdf.

Because of the ease with which electronic documents can be edited and distributed, updated versions of documents are often available. The updates may include new or updated information and/or correct errors in the original documents. In the case of documentation for a software program, updates may correspond to changes introduced by a new version of the software program. In any event, it is often desirable to have, or at least be aware of, the most-recent version of an electronic document.

In many cases, a user can check for the most-recent version of a document by revisiting the Internet or network source for the document. However, this method can be inconvenient, especially as a document may have been downloaded in part to avoid having to revisit the Internet for the information contained in the document. Also, visiting the original site may be problematic where the site has been changed or its address has been forgotten. In addition, some documents appear on multiple sites so that there is no guarantee that the site a user downloaded a document from had or has the most recent version. What is needed is a more convenient method of allowing a user to determine the existence of and to access an updated version of a previously downloaded document.

SUMMARY OF THE INVENTION

The present invention provides a document-reader program that accesses a network location specified in an original version document file to determine whether or not an updated version exists. To this end, the program can include 1) a document parser for identifying a network location specified by an original version of the document file, 2) a network interface for accessing an updated version of the document file via the network location, and 3) a renderer for causing information in the updated version to be rendered in human-cognizable form. The program can then render the information in the updated version in human-cognizable form; preferably, the user is given the option of rendering the original or the updated version.

The invention can be initiated by a request to read the original document. This request can take the form of: 1) selecting the document (e.g., by double-clicking its file name), 2) opening the document from within the reader program, or 3) accessing the document from within another application (e.g., accessing a help file by selecting help within the application) so as to launch the reader program and open the document therein.

In the last instance, the document can be a help file for the application in pdf or html format. If there is an update to the application itself available, the invention provides for either 1) an updated file that corresponds to the most recent documentation for the most recent version of the host application, or 2) an updated file that corresponds instead to the most recent documentation for the local version of the host application. In the latter case, the reader program can include an application interface for receiving a version identifier from the host program.

Steps of acquiring the network location identifier, accessing the network location, downloading the updated document file, and rendering information from the updated document file can take place automatically to minimize a user's burden. Herein, a step is "automatic" if it requires no user action or if it merely requires an assent by the user.

A major advantage of the invention is that a user requesting help is provided current information even if the original (that is, local before the updated version is accessed) is out of date. Having the URL in the document can direct the user to the site that originated the document, rather than to a mirror site from which the user happened to download the document (and that may not have the most recent version of the document). Moreover, specifying the network location in the document file allows different versions of the document file to direct the reader program to different network locations. These and other features and advantages of the invention are apparent from the description below with reference to the following drawings.

DETAILED DESCRIPTION

Figure 1:
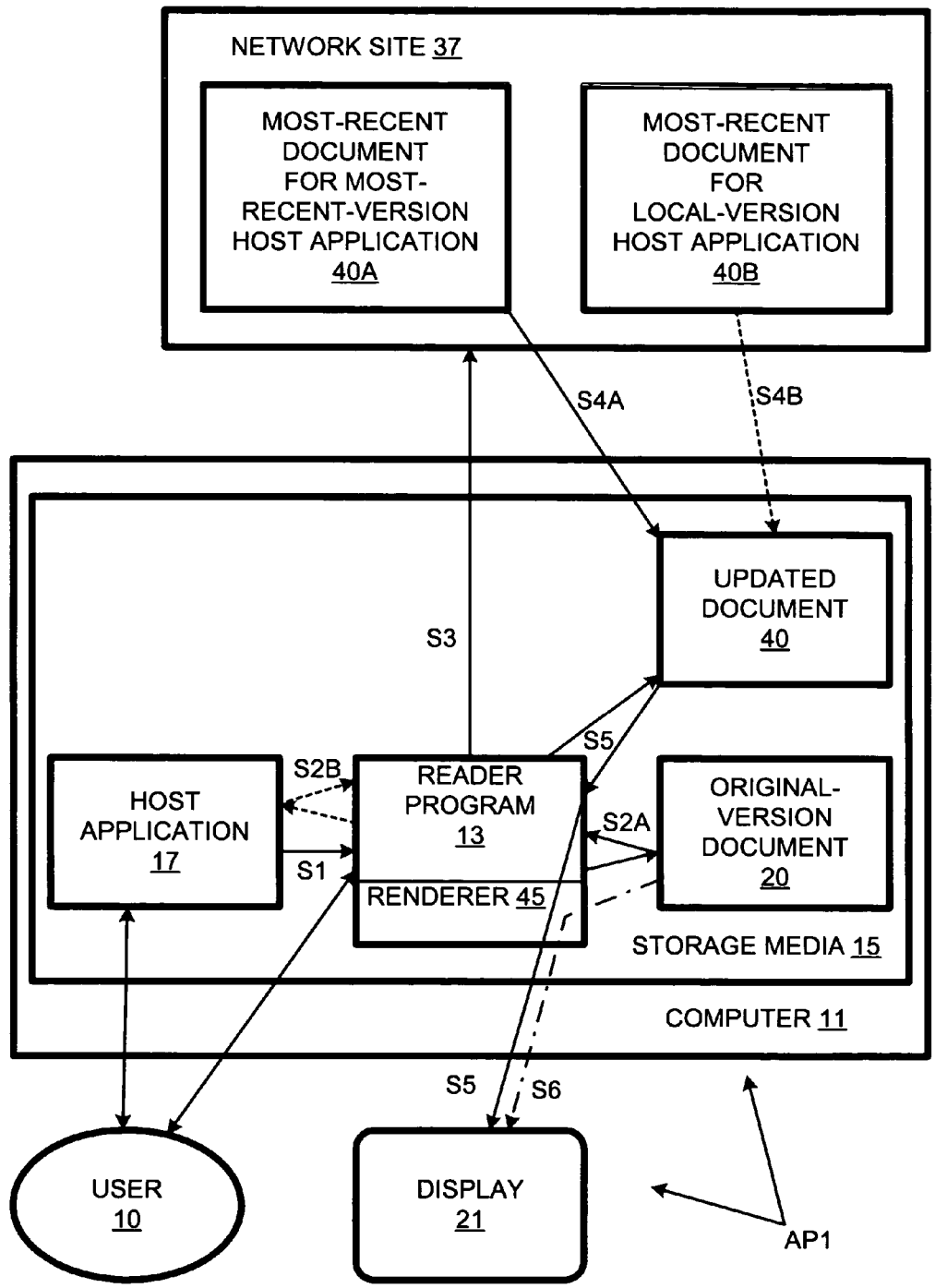
FIG. 1 is a block diagram of a system for updating a document file in accordance with the present invention.

In accordance with the present invention, a user 10 operates a computer system AP1 including a computer 11 on which a document reader program 13 is installed, as shown in FIG. 1. Computer 11 includes a hard disk system 15 on which reader program 13, a host application 17, and an original-version (relative to an updated version) of a document file 20 reside. In this embodiment, document file 20 is a help file for host application 17. When a user requests help, host application 17 directs reader program 13 to display information contained in document file 20 in human-cognizable form on a display 21.

Figure 2:
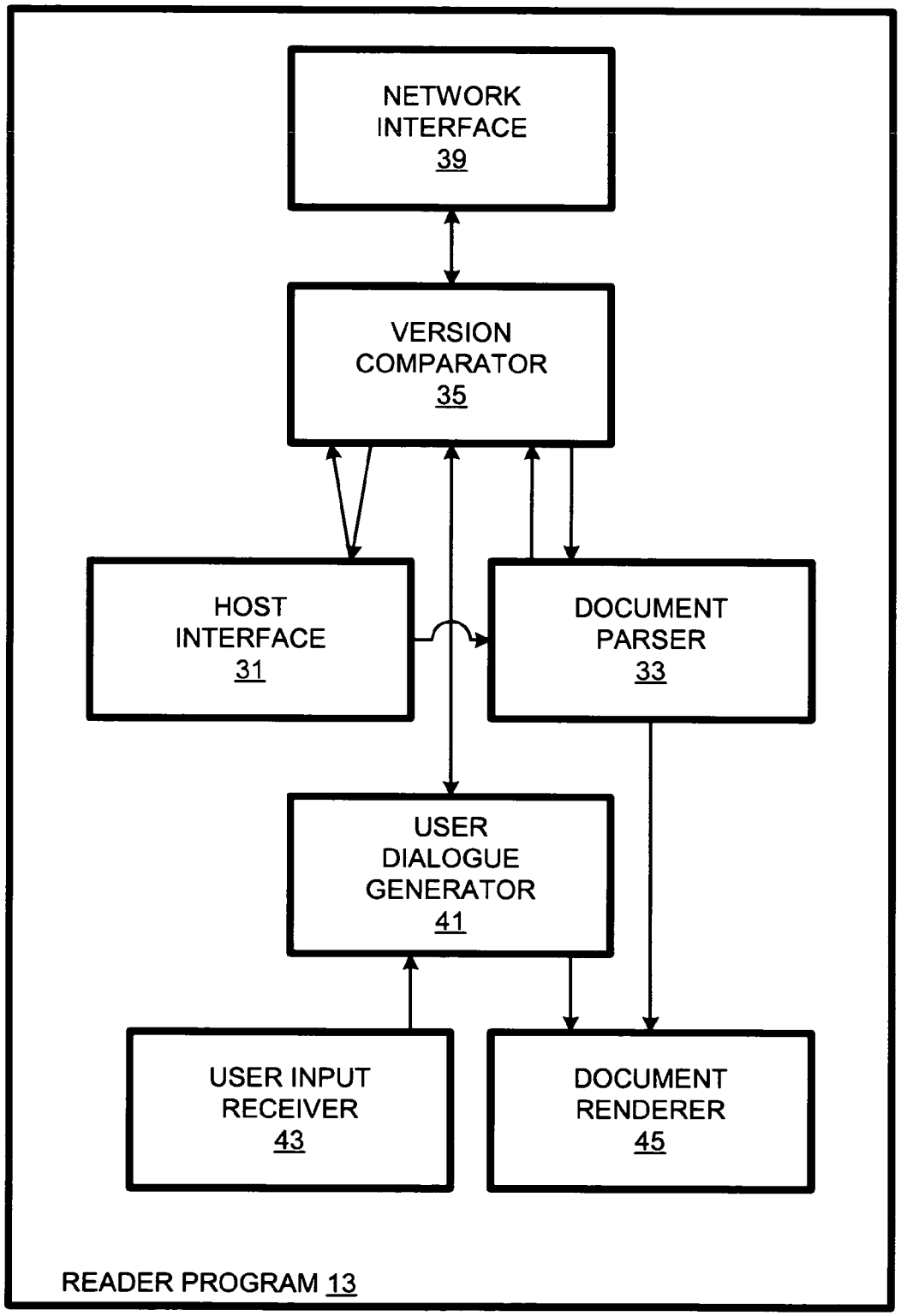
FIG. 2 is a block function diagram of a reader program of the system of FIG. 1.

Reader program 13 has several functional modules, as shown in FIG. 2. A host interface 31 receives requests and can be used to query host application 17 as to its version number. A document parser 33 accesses a document file, distinguishing information to be displayed, version data, and a network location identifier, such as a URL ("uniform resource locator").

A version comparator 35 accesses the specified network site 37 (FIG. 1) via a network interface 39 (FIG. 2). Version comparator 35 determines the availability of an updated document file 40 by accessing information at the network site and comparing version information obtained from original-version document file 20 and, optionally, from host application 17. At various points in the comparison process, a user 10 can be presented options by user dialog generator 41; user responses are received by user input receiver 43. Once it is determined that an original or replacement version of a document file is to be displayed, a renderer 45 effects display of the desired information in human-cognizable form.

Figure 3:
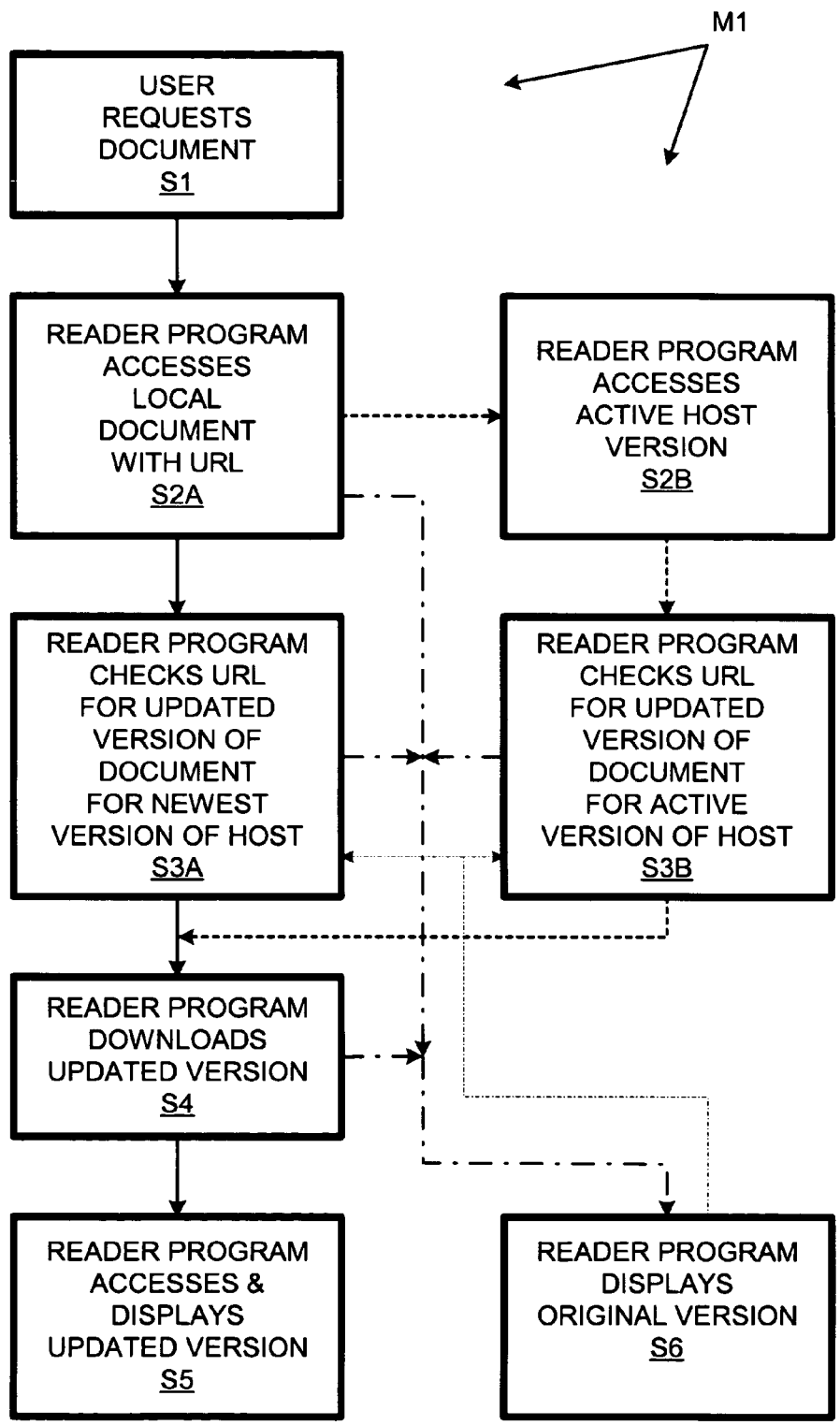
FIG. 3 is a flow chart of a method for updating a document file in accordance with the present invention.

A method M1 of the invention is flow-charted in FIG. 3. At step S1, a user requests a display of information in document file 20. This request can be made by opening the document file (e.g., by double-clicking its file name), opening the document from within reader program 13, or selecting help in host application 17. Reader program 13 receives the request and accesses the original-version document file 20 at step S2A. Document file 20 is "original" in contrast to an "updated" file; as used herein, the term "original" does not exclude document files that have replaced predecessor document files. In particular, document parser 33 identifies a URL and a version number for document file 20, and provides these to version comparator 35.

At this point, method M1 branches into "A" and "B" variants. In the A variant, the objective is to obtain the most recent version 40A of the document file, irrespective of the version of the host application. In the B variant, the object is to obtain the most recent version 40B of the document file for the local (i.e., active) version of host application 17. In cases in which a user selects a document that is not related to a host application, variant A applies.

For example, host application version 1.0 can reside on computer 11, while an updated version 2.0 of the host application is available at the manufacturer's site. Original document file 20 is version 1.0. There is available a 1.1 version 40B of the document file that better describes the operation of host application 1.0; there is also available 2.0 version 40A that describes the operation of host application 2.0. Variant A seeks to obtain 2.0 version 40A, while variant B seeks to obtain 1.1 version 40B. Note that in FIG. 1, step S3 is unified, while the variants S3A and S3B are differentiated in FIG. 2; conversely, step S4 is unified in FIG. 2, but variants S4A and S4B are differentiated in FIG. 1.

In variant A, version comparator 35 accesses the specified network site 37 to determine whether or not a updated document file is available at step S3A. If it is available, it is downloaded to hard disk 15 at step S4 and information it contains is rendered in human-cognizable form at step S5 on display 21. If no replacement document is available, information from original document file 20 is displayed in human-cognizable form at step S6.

In variant B, version comparator 35 must also obtain the host application version at step S2B (which can occur, before, during, or after step 2A). Method M1 provides that either 1) host application 17 provides a version number with the help request, or 2) reader program 13 queries or reads a version number for host application 17. Version comparator 35 then checks network site 37 for a replacement version of document file relating to the active version of host application 17. In this variant B, a more recent document version relating to a more recent application version is not considered as an updated document. If a more recent document version 40B relating to the active host application version is available, it is downloaded at step S4 and its information is rendered at step S5. As in variant A, if a suitable updated document is not found, information from original-version document file 20 is displayed at step S6.

Both variants A and B provide for automatic operation, either with no user involvement or with user involvement limited to assenting to proposed operations. In cases without user input, an updated document is displayed unless at step S3A or step S4A, it is determined that there is no updated document; in this former case, the original document is displayed as indicated by the dot-dash lines exiting steps S3A and S3B. In cases with user input, step S2A can begin by displaying a user dialog box reading "Check for newer version of help file: Yes/No?". For another example, step S4 can begin with a dialog box reading "There is a newer version of the help file available. Do you wish to download it? Yes/No". "No" responses to these options are indicated by the dot-dash lines exiting steps S2A and S4 in FIG. 3, and result in the original version being displayed.

Method M1 provides for alternative step ordering; not all steps are required and additional steps can be involved. For example, the original version can be displayed first and then the user can be provided options to check for an updated document and/or to display an updated document; in this case the step order can be S1-S2A-S6-S3A-S4-S5 or S1-S2A-S2B-S3B-S4-S5. These variations, indicated in part by the double-dot-dash lines from step S6 in FIG. 3, are particularly attractive where the computer, which can be a laptop, is temporarily disconnected from a network having access to the specified URL. In this case, reconnection to the network can be a triggering event that causes the URL to be accessed.

The invention provides for many alternatives to the embodiments detailed above. The document file can relate to an application program, system software, or other non-application software. More generally, the invention applies to any electronic document. For example, the document file can present standings of teams in a sports league. While the document is preferably in a format that provides for meta-data (data not intended to be displayed to the user), the invention can be applied where the document URL is itself rendered. In this vein, the invention provides a specialized reader for ASCII files.

In embodiments in which the document file relates to a host application, the reader program can be a module of the host application or a separate entity. In the latter case, the host application can call the reader program directly; alternatively, the reader program can be called indirectly; for example, the host application can access the document file and this access can launch a default program that is the reader program.

The invention provides for alternative methods of triggering the updating procedure: 1) a user can request help through a host application; 2) a user can open a document file from within the reader program; or 3) a user can open the document file directly (e.g., using the operating system file-management tools) so that the reader program is automatically launched. In the latter two cases, no host application is involved. In any event, document updating can occur because it is the reader program and not the host application that handles the updating.

In the illustrated embodiment, documents are rendered in that they are displayed page-by-page on a monitor. However, the invention provides for alternative visual displays. In addition, the invention provides for non-visual rendering. For example, a document can be read out loud by the computer, with or without concomitant display.

The network location specified in the document file can be an Internet location or non-Internet network location. The network location can either store the replacement document file or it can simply indicate the existence of the replacement file and direct the program reader to it. If the network connection is fast enough, the replacement file can be displayed without being downloaded. In other words, it need not be stored on a local hard disk in its entirety to allow display. In that case, the user should be given the option of downloading the replacement file; the original file can be deleted or it can be retained once the replacement file is made the default. Node that reader program is of a type that includes Adobe Acrobat, and can include the range of features associated with that program in addition to those described herein. These and other variations upon and modifications to the detailed embodiments are provided for by the present invention, the scope of which is defined by the following claims.

What is claimed is:

1. A computer system comprising:
   computer-readable media,
   a computer-executable reader program for rendering information in a computer-readable document file in human-cognizable form, said reader program being stored on said computer-readable media, said reader program including
      a document parser for identifying a network location specified by an original version of said document file stored on said computer system,
      a network interface for accessing an updated version of said document file via said network location, and
      a renderer for causing information in said updated version to be rendered in human-cognizable form.

2. A computer system as recited in claim 1 wherein said reader program further includes a host interface for receiving a help request from a local version of a host application, said document file being a help file for said host application, said updated version of said document file being a more-recent version of said help file for a more-recent version of said host application.

3. A computer system as recited in claim 2 wherein said document is in pdf or html format.

4. A computer system as recited in claim 1 wherein said reader program further includes a host interface for receiving a help request from a local version of a host application, said document file being a help file for said host application, said updated version of said document file being a more-recent version of said help file for said local version of said host application.

5. A computer system as recited in claim 4 wherein said host interface also provides for receiving a version identification for said host application from said host application.

6. A computer-implemented method comprising:
   accessing an original version of a document file stored on a computer system, said original version of said document file specifying a network location;
   accessing an updated version of said document file via said network location, said updated version having updated information, said updated version being stored on a remote network site not including said computer system; and
   rendering said updated information in human-cognizable form.

7. A method as recited in claim 6 further comprising receiving a help request from a local version of a host application, said accessing an original version occurring in response to said help request, said updated version corresponding to a more-recent version of said document file for a more-recent version of said host application.

8. A method as recited in claim 7 wherein said document is in html or pdf format.

9. A method as recited in claim 6 further comprising receiving a help request from a local version of a host application, said accessing an original version occurring in response to said help request, said updated version corresponding to a more-recent version of said document file for said local version of said host application.

10. A method as recited in claim 9 further comprising receiving version identification for said host application from said host application.

* * * * *